(12) United States Patent
Erdl et al.

(10) Patent No.: US 9,689,548 B2
(45) Date of Patent: Jun. 27, 2017

(54) LIGHTING DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 14/742,224

(22) Filed: Jun. 17, 2015

(65) Prior Publication Data
US 2015/0285457 A1 Oct. 8, 2015

Related U.S. Application Data

(63) Continuation of application No. PCT/EP2013/074679, filed on Nov. 26, 2013.

(30) Foreign Application Priority Data

Dec. 18, 2012 (DE) .......................... 10 2012 223 610

(51) Int. Cl.
*F21S 8/10* (2006.01)
*G02B 26/10* (2006.01)
(Continued)

(52) U.S. Cl.
CPC ............ *F21S 48/1388* (2013.01); *F21K 9/64* (2016.08); *F21S 48/1145* (2013.01);
(Continued)

(58) Field of Classification Search
CPC ............... F21S 48/1145; F21S 48/1159; F21S 48/1388; F21S 48/145; F21S 48/1757;
(Continued)

(56) References Cited

U.S. PATENT DOCUMENTS 5,400,225 A 3/1995 Currie
7,708,441 B2 5/2010 Luecke et al.
(Continued)

FOREIGN PATENT DOCUMENTS

CN 102132085 A 7/2011
CN 102753885 A 10/2012
(Continued)

OTHER PUBLICATIONS

Chinese Office Action issued in Chinese counterpart application No. 201380052938.1 dated Apr. 19, 2016, with English translation (Fifteen (15) pages).
(Continued)

*Primary Examiner* — Thomas M Sember
(74) *Attorney, Agent, or Firm* — Crowell & Moring LLP

(57) ABSTRACT

The invention relates to a lighting device for a motor vehicle, where the light device includes a light source having a plurality of semiconductor diodes, and a scanning device onto which light from the light source is incident and which generates a temporally varying deflection of the incident light from the light source during operation of the lighting device and thereby generates a predetermined light distribution at a distance from the lighting device. The scanning device has at least two separately controllable scanners, onto each of which a separate light beam generated from the light source is incident, the deflection of which beam is temporally varied by the respective scanner.

21 Claims, 4 Drawing Sheets

(51) Int. Cl.

| | | |
|---|---|---|
| *G02B 27/09* | (2006.01) | |
| *F21V 17/00* | (2006.01) | |
| *F21K 9/64* | (2016.01) | |
| *G02B 26/08* | (2006.01) | |
| *F21Y 101/00* | (2016.01) | |
| *F21Y 115/30* | (2016.01) | |
| *F21Y 115/10* | (2016.01) | |

(52) U.S. Cl.
CPC ......... *F21S 48/1159* (2013.01); *F21S 48/145* (2013.01); *F21S 48/1757* (2013.01); *F21S 48/215* (2013.01); *F21S 48/234* (2013.01); *F21S 48/32* (2013.01); *F21V 17/00* (2013.01); *G02B 26/101* (2013.01); *G02B 27/0933* (2013.01); *F21Y 2101/00* (2013.01); *F21Y 2115/10* (2016.08); *F21Y 2115/30* (2016.08); *G02B 26/0858* (2013.01); *G02B 26/105* (2013.01)

(58) Field of Classification Search
CPC ........ F21S 48/215; F21S 48/234; F21S 48/32; G02B 26/0858; G02B 26/101; G02B 26/105; G02B 27/0933; F21V 17/00; F21K 9/64
See application file for complete search history.

(56) References Cited

U.S. PATENT DOCUMENTS

| | | |
|---|---|---|
| 2003/0156422 A1 | 8/2003 | Tatewaki et al. |
| 2009/0046474 A1 | 2/2009 | Sato et al. |
| 2010/0302799 A1 | 12/2010 | Rosberg et al. |
| 2011/0249460 A1 | 10/2011 | Kushimoto |
| 2012/0262425 A1 | 10/2012 | Andreola et al. |

FOREIGN PATENT DOCUMENTS

| | | |
|---|---|---|
| DE | 103 08 703 A1 | 11/2004 |
| DE | 103 23 317 A1 | 12/2004 |
| DE | 103 44 174 A1 | 4/2005 |
| DE | 10 2008 015 561 A1 | 8/2009 |
| DE | 10 2010 003 270 A1 | 9/2011 |
| DE | 10 2010 028 949 A1 | 11/2011 |
| DE | 10 2010 048 659 A1 | 4/2012 |
| DE | 10 2011 013 211 A1 | 9/2012 |
| EP | 1 970 250 A1 | 9/2008 |
| EP | 2 596 992 A2 | 5/2013 |
| JP | 2005-276805 A | 10/2005 |
| WO | WO 2013/120124 A2 | 8/2013 |
| WO | WO 2014/002480 A1 | 1/2014 |

OTHER PUBLICATIONS

International Search Report dated May 20, 2014 (Three (3) pages).

German Search Report dated Oct. 29, 2013, with Statement of Relevancy (Six (6) pages).

International Search Report dated Apr. 2, 2014 (Three (3) pages).

German Search Report dated Aug. 1, 2013, with Statement of Relevancy (Six (6) pages).

LIGHTING DEVICE FOR A MOTOR VEHICLE

CROSS REFERENCE TO RELATED APPLICATIONS

This application is a continuation of PCT International Application No. PCT/EP2013/074679, filed Nov. 26, 2013, which claims priority under 35 U.S.C. §119 from German Patent Application No. 10 2012 223 610.4, filed Dec. 18, 2012, the entire disclosures of which are herein expressly incorporated by reference.

BACKGROUND AND SUMMARY OF THE INVENTION

The invention relates to a lighting device for a motor vehicle.

The prior art has disclosed lighting devices for motor vehicles comprising a scanner, by means of which a predetermined light distribution in the far field of the vehicle is generated by means of the deflection of a light beam via a reflecting scanning mirror.

In the case of lighting devices comprising a scanner, it is found to be disadvantageous that the deflection frequency of the scanning mirror has to be very high in order to generate structures in the light distribution with a high resolution or with strong gradients. This leads to bothersome scanning effects, such as the stroboscopic effect, particularly at high vehicle speeds. In order to generate light/dark boundaries, scanning lighting devices require a very high optical resolution so as to be able to produce the necessary gradients in the light distribution. Furthermore, the practice of introducing physical stops into the beam path of the light beam for generating light/dark boundaries is known. However, these are disadvantageous in that, in general, they lead to shadowing effects in the generated light distribution.

It is an object of the invention to develop a lighting device for a motor vehicle, by means of which a light distribution with a high quality can be produced.

This object is achieved by the lighting device in accordance with the independent claims. Developments of the invention are defined in the dependent claims.

The lighting device according to the invention is provided for a motor vehicle such as e.g. a passenger car or a truck. It comprises a light source made of a number of semiconductor diodes and a scanning apparatus, onto which light from the light source is incident and which, when the lighting device is in operation, produces a time-varying deflection of the incident light from the light source and, thereby, a predetermined light distribution at a distance from the lighting device. Here, the predetermined light distribution is generated in the far field of the lighting device in particular. Here, the far field should be understood to mean the light distribution at a distance from the lighting device, which is substantially greater than the dimensions of the lighting device and, in particular, lies in the region of 25 m in front of the lighting device.

The lighting device according to the invention is distinguished by virtue of the fact that the scanning apparatus installed therein comprises at least two separately actuatable scanners, onto which in each case a separate light beam produced from the light of the light source is incident, the deflection of which light beam is varied in time by the respective scanner. Here, a light beam should be understood to mean a beam of light rays within a restricted angle or space, wherein the light rays in the bundle may extend substantially parallel to one another or else may diverge or converge. Therefore, the scanning apparatus comprises at least two separate scanners with assigned deflection elements which, in particular, are embodied as reflecting scanning mirrors. By the separate actuation of the scanners, the deflection elements can independently of one another cause a time variation in the deflection of the corresponding light beam. By using more than one scanner, the deflection frequency of the individual scanners can be reduced in the case of an unchanged resolution or an unchanged gradient in the light distribution, as a result of which bothersome scanning effects, which occur at high vehicle velocities in particular, are avoided.

In a particularly preferred embodiment of the lighting device according to the invention, one or more of the scanners and, in particular, all of the scanners of the scanning apparatus in each case comprise a two-dimensional scanning unit, by means of which the corresponding light beam can be deflected in two directions and, in particular, in a horizontal and in a vertical direction. Here, the horizontal and vertical directions relate to the lighting device in the assembled state in the vehicle, i.e. the vertical direction extends perpendicularly upward from the roadway and the horizontal direction extends parallel to the roadway. Here, the two-dimensional scanning unit can be embodied as a 2D scanner with an individual deflection element or scanning mirror swivelable in two directions. Optionally, the two-dimensional scanning unit can also be formed by two deflection elements or scanning mirrors which are actuated together. In a particularly preferred embodiment, the scanners of the lighting device according to the invention are, at least in part, vector scanning units, in which the scanning speed and scanning direction can be varied.

In a further embodiment, the lighting device according to the invention comprises at least one entrance optical means for the light from the light source, wherein, when the lighting device is in operation, the separate light beams are produced by way of the at least one entrance optical means. Preferably, a common entrance optical means is provided for producing all separate light beams. As a result of this, the setup of the lighting device becomes less complex. The entrance optical means may e.g. comprise a lens array, wherein a separate light beam is generated by each lens of the array. Here, a collimator lens for focusing the light originating from the light source is preferably disposed upstream of the lens array.

In a further, particularly preferred embodiment, the lighting device is configured in such a way that the separate light beams generate light spots with different sizes in the predetermined light distribution. This renders it possible, in a very flexible manner, to produce different light distributions with, in portions, different resolutions by means of the lighting device, and so the scanning lighting apparatus can assume the function of an adaptive optical element in the form of a lens with a variable refractive power.

In a further embodiment of the lighting device according to the invention, at least one exit optical means, by means of which the predetermined light distribution is generated as an image at a distance from the lighting device, is provided for the light beams deflected by the at least two scanners. Preferably, a common exit optical means is provided for all deflected light beams, as a result of which the setup of the lighting device is simplified.

In a further embodiment of the lighting device according to the invention, one or more of the scanners of the scanning apparatus in each case generate a separate region of the predetermined light distribution. However, alternatively or additionally, it is also possible for at least two scanners to generate overlapping regions of the predetermined light distribution.

In a further embodiment of the lighting device according to the invention, a stop, by means of which the light distribution can be delimited, is arranged in the beam path of the light beams after deflection by the scanning apparatus. In a preferred embodiment, a light/dark boundary is generated in the predetermined light distribution by the stop. The stop preferably extends substantially parallel to an optical axis predetermined by the beam path of the light beams.

In a particularly preferred embodiment, the stop brings about a subdivision of an image plane into two regions, wherein, in at least one mode of operation of the lighting device, a part of the scanning apparatus is provided exclusively for deflecting light beams in a region on one side of the stop and, in particular, below the stop and the other part of the scanners of the scanning apparatus is provided exclusively for deflecting light beams in a region on the other side of the stop and, in particular, above the stop. This renders it possible to avoid shadowing effects, which may occur when a scanning apparatus with a single scanner is used. For explanatory purposes, these shadowing effects will be returned to in more detail in the detailed description. In a preferred variant, the aforementioned image plane, which is subdivided into two regions, is an intermediate image plane which is imaged by an exit optical means into the predetermined light distribution at a distance from the lighting device.

Optionally, it is furthermore possible that, in addition or in place of the above-described stop, which is arranged in the beam path of the light beams after deflection by the scanning apparatus, provision made for one or more further stops at different positions in the beam path, e.g. in front of the scanning apparatus.

As an alternative or in addition to the above-described stop, provision is made in a further preferred embodiment for at least one scanner, exclusively for generating the light distribution at the light/dark boundary in at least one mode of operation of the lighting device (e.g. when generating a dipped beam characteristic). Here, this scanner can be operated with a higher deflection frequency than the other scanners or this scanner can generate a smaller light spot than the other scanners in the light distribution in order hereby to achieve high resolutions in the region of the light/dark boundary such that, optionally, it is possible to dispense with the use of physical stops for generating strong gradients in the light distribution. This is advantageous in that a gradient profile can be configured variably, i.e. independently of rigid physical stops, in a light distribution.

In a further embodiment of the lighting device according to the invention, the at least two scanners of the scanning apparatus are provided on a common assembly, wherein the common assembly includes, in particular, a common cooling unit and/or a common electronics unit for the scanners and/or a common mechanical adjustment apparatus for a support, on which the scanners are assembled. As a result, a simple setup of the scanning apparatus is achieved. Furthermore, due to the use of a plurality of scanners, a relatively large spread in the local temperature load on the cooling unit is ensured, which significantly reduces the installation space and the weight of the cooling elements employed in the cooling unit.

In a further variant, at least one scanner and, in particular, each one of the scanners of the scanning apparatus is embodied as a MEMS element, which allows a particularly compact and robust embodiment with high deflection speeds as a result of the micromechanical scanner setup thereof. In particular, these elements are suitable for an array-shaped arrangement on a common assembly and can also be employed for high-power applications in the automotive sector as a result of the distribution of the light fluxes to a plurality of units.

In a further variant, the number of semiconductor diodes comprises one or more and in particular exclusively laser diodes. As a result, it is possible to produce a light distribution with a very high local luminous intensity. The laser diodes preferably have a respective maximum power of at least 1 W and, in particular, of between 1.5 and 5 W. Preferably, the number of semiconductor diodes for generating the predetermined light distribution is operated with constant and, in particular, maximum power, as a result of which the lighting device is used particularly efficiently.

In a further embodiment of the invention, the light source is a monochromatic light source, wherein a conversion element is provided for converting the light from the light source into white light. Such conversion elements are known per se from the prior art. By way of example, in the case of blue/violet laser diodes with an emission wavelength of 450 nm/405 nm, it is possible to use a phosphor conversion element made of a nitride phosphor or an oxide nitride phosphor or a cerium-doped YAG phosphor for generating white light.

The conversion element, which is configured as a layer in particular, can be arranged at different positions depending on the embodiment of the invention. In one variant, the conversion element is arranged at a position at which the light beam has already passed through the scanning apparatus, e.g. in the aforementioned intermediate image plane. However, the conversion element can also be arranged at the light source or between the light source and the scanning apparatus. In the latter case, the conversion element is arranged at a position in the beam path of the light beam before the light beam is incident on the scanning apparatus.

Depending on the application, the lighting device according to the invention can assume various functionalities. In one embodiment, the lighting device comprises a headlamp. A headlamp is distinguished by virtue of the fact that it actively illuminates the surroundings of the vehicle. Optionally, the lighting device according to the invention may also comprise a signal light, which is distinguished by virtue of the fact that it only serves for providing signals to other traffic participants. Likewise, the lighting device according to the invention may be a combination of headlamp and signal light.

In a preferred variant, the lighting device is configured as a headlamp in such a way that, during operation, a dipped beam characteristic and/or a main beam characteristic can be generated as predetermined light distribution. A dipped beam characteristic is distinguished by a sharp light/dark boundary, which is preferably generated using the above-described stop. The scanner used in the region of the light/dark boundary preferably has a high or higher local resolution compared to other scanners of the scanning apparatus. This can be achieved by a light spot being generated by this scanner, said light spot having a smaller size than the light spots from the other scanners.

In addition to the lighting device according to the invention, the invention furthermore relates to a motor vehicle comprising one or more of the lighting devices according to the invention.

Exemplary embodiments of the invention are described in detail below on the basis of the attached figures.

In detail:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
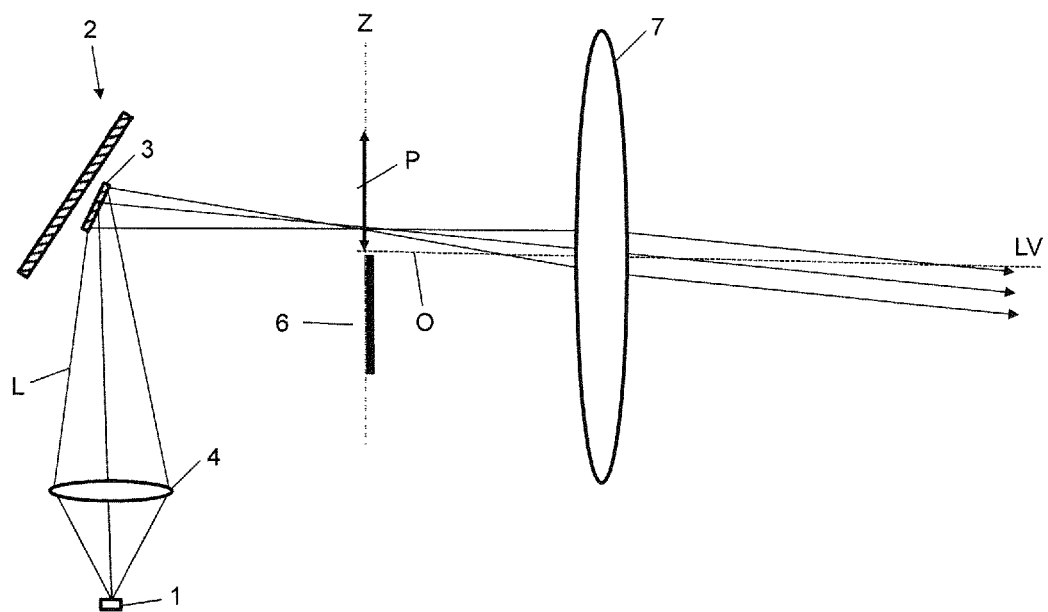
FIG. 1 shows a schematic illustration of a known lighting device comprising a single scanner.

FIG. 1 reproduces a side view of a known lighting device for a motor vehicle. This lighting device is a headlamp installed in a motor vehicle (not shown). The lighting device comprises a light source 1, e.g. in the form of an array made of a plurality of semiconductor diodes, by means of which light source white light is produced. Optionally, monochromatic semiconductor diodes or laser diodes can also be used as a light source, wherein, in this case, provision is additionally made at a suitable position in the beam path of the light for a conversion element, e.g. in the form of a phosphor layer, for converting the monochromatic light into white light. In particular, the intermediate image plane Z, described further below, is a suitable position for the conversion element.

Figure 2:
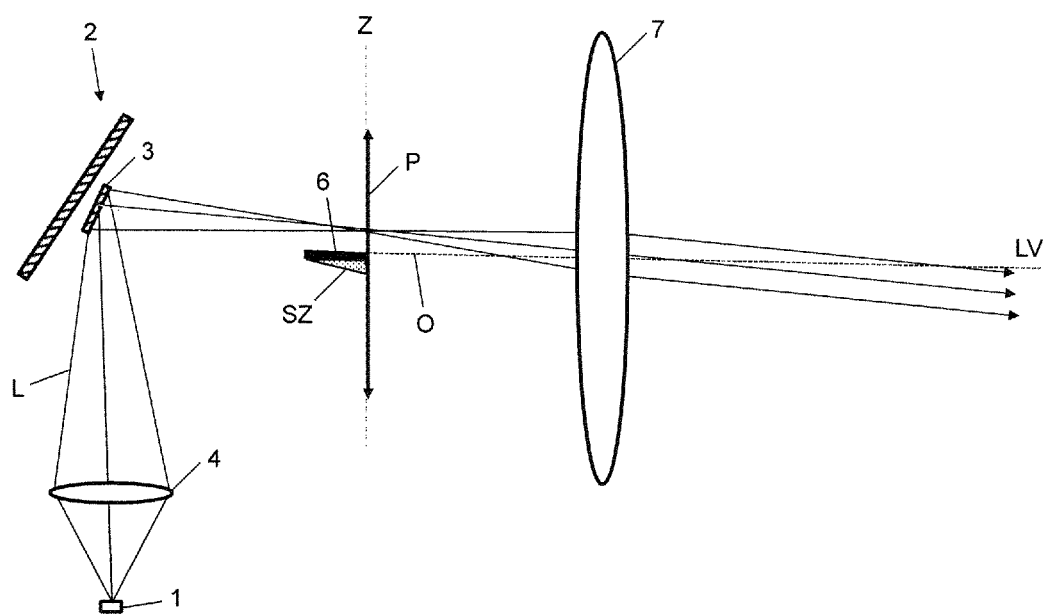
FIG. 2 shows a schematic illustration of a modification of the lighting device from FIG. 1 with an alternative stop position.
Figure 3:
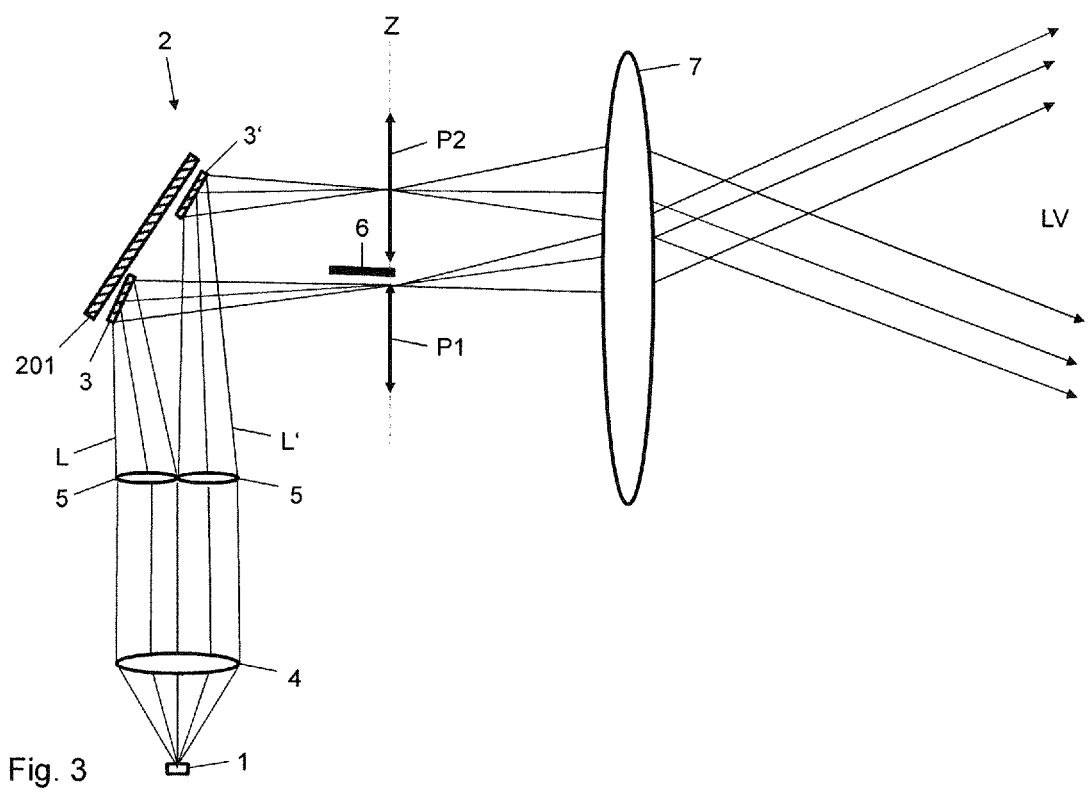
FIG. 3 shows a schematic illustration of an embodiment of a lighting device according to the invention comprising a plurality of scanners.
Figure 4:
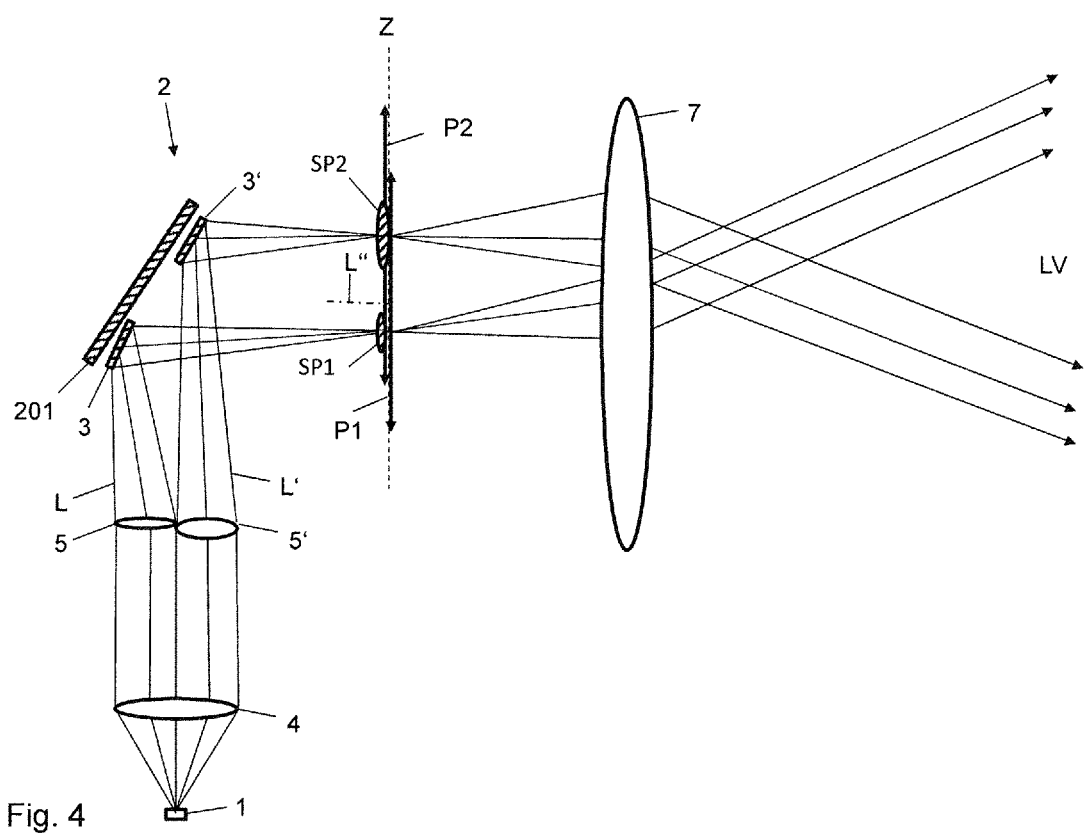
FIG. 4 shows a schematic illustration of a further embodiment of a lighting device according to the invention.

The light from the light source 1 is collimated to form a light beam L by means of a collimator lens 4. Here, the beam path of the light beam in FIG. 1 and also of the light beam in FIGS. 2 to 4 is indicated by three lines. The light beam L is incident on a scanning apparatus 2, which, in a manner known per se, comprises a single 2D scanner 3. Here, the scanning range of the scanner 3 in the vertical direction in the intermediate image plane Z is indicated by the double-headed arrow P. The scanner is actuated in a suitable manner by means of an actuation unit (not shown here) and it deflects the light beam in a horizontal direction (i.e. perpendicular to the plane of the sheet) and in a vertical direction (i.e. in the plane of the sheet) in a time-varying manner by means of a scanning mirror. This deflected light beam passes a stop 6, which is arranged perpendicular to the optical axis O of the lighting device in FIG. 1. This stop sets the profile of a light/dark boundary, which is required for a dipped beam characteristic of the headlamp. Here, the light/dark boundary initially extends horizontally from the distant end of the roadway edge and then extends obliquely upward in the vicinity of the roadway edge. The lighting device furthermore comprises an exit optical means in the form of a lens 7, which generates imaging of the intermediate image plane Z into a light distribution LV in the far field of the lighting device on the street. No light can be generated in the region of the stop using this arrangement, and so the scanner can only generate a variable light distribution below the light/dark boundary in this case.

FIG. 2 substantially depicts the same lighting device as shown in FIG. 1, the only difference being that the stop 6 is now arranged horizontally (i.e. along the optical axis O) and the scanning range has a greater vertical extent. A horizontal stop arrangement renders it possible to use the scanner to generate both various dipped beam distributions and various main beam distributions, and also arbitrary combinations thereof. In order to generate a dipped beam characteristic, the scanner substantially only scans in the scanning range above the stop 6, as a result of which a light distribution below the profile of the stop is generated in the far field by way of optical imaging by the lens 7. When the main beam is switched on, scanning is carried out substantially in the whole scanning range P, and so a light distribution is generated in a substantially larger vertical range. However, the problem here is that a shadowing is generated in the region of the stop 6, which is elucidated by the shadow zone SZ in FIG. 2. Thus, unwanted shadows occur in the light distribution of the main beam. Such shadows can be avoided using the embodiment of the lighting device according to the invention described in the following.

FIG. 3 shows, in a side view, a schematic illustration of an embodiment of a lighting device according to the invention. A large part of the lighting device from FIG. 3 corresponds to that of FIG. 1 or FIG. 2, with the same reference signs being used for denoting the same components in both figures. Analogously to FIG. 2, the lighting device in FIG. 3 comprises a light source 1 in the form of an array of semiconductor diodes, which generate white light. As in FIG. 1 or FIG. 2, use can optionally also be made of monochromatic semiconductor diodes or laser diodes, wherein, once again, an appropriate conversion element is to be arranged in the beam path in this case. The light from the light source 1 reaches a scanning apparatus 2 through an entrance optical means, which comprises a positive lens 4 and a lens array consisting of two lenses 5. Here, the substantial difference between the device in FIG. 2 and the device in FIG. 3 consists of the fact that, in accordance with FIG. 3, the entrance optical means is used to generate two separate light beams L and L' and the scanning apparatus 2 comprises separately actuatable scanners 3 and 3' with appropriate scanning mirrors, on which scanners one of the light beams L and L' is incident in each case. The two scanners are operable independently of one another, that is to say the respective light beams can be deflected independently of one another. Once again, the two scanners 3 and 3' are 2D scanners, which are able to swivel the respective light beam in the horizontal and vertical direction. Preferably, so-called vector scanners, by means of which—in contrast to line scanners—the scanning speed or scanning direction, and hence the deflection of the respective light beam, can be varied freely, are used as scanners. This enables a great degree of freedom in the generation of desired light distributions.

In the embodiment of FIG. 3, the two separate scanners are arranged on a common assembly, which is schematically indicated by the reference sign 201. A common cooler for the reflecting scanning mirrors is formed by the common assembly in this case. Likewise, use can be made of common electronics for the scanners, wherein, however, the actuation by means of these common electronics is separate for the individual scanners. Moreover, a common mechanical adjustment apparatus can optionally be used for roughly adjusting the scanners. This adjustment apparatus can modify the location of a common support, on which the scanners are arranged.

Analogously to the embodiment in FIG. 2, the lighting device in FIG. 3 comprises a stop 6, which extends parallel to the optical axis (not visible in FIG. 2) and which is arranged in the region of the intermediate image plane Z.

The stop once again produces a light/dark boundary for a dipped beam characteristic of the headlamp. The intermediate image plane is once again converted into the light distribution LV on the street by means of an exit optical means 7 in the form of a lens. In the embodiment of FIG. 2, the scanning range of the scanner 3 lies below the stop 6, as indicated by the double-headed arrow P1. By contrast, the scanning range of the scanner 3' lies above the stop 6, as indicated by the double-headed arrow P2. In order to generate a dipped beam distribution, use is made in this case substantially only of the scanner 3', which generates the dipped beam characteristic with the aid of the stop 6. If the main beam is switched on, the scanner 3 is furthermore put into operation, and so regions situated higher up horizontally are also illuminated. As a result of the separate scanning ranges of the two scanners 3 and 3', total shadowing, which occurs during the use of a single scanner in the device in FIG. 2, is avoided in the process.

In a modification of the embodiment in FIG. 1, the scanning ranges P1 and P2 of the two scanners 3 and 3' can also overlap in order to obtain a good light yield. By way of example, the scanner 3' can scan in the direct vicinity above the stop 6 only when generating a dipped beam characteristic, whereas the scanner 3 illuminates the remaining range above the stop. By contrast, when generating a main beam distribution, both scanners 3 and 3' operate in a scanning range both above and below the stop.

FIG. 4 shows a modification of the embodiment in FIG. 3. Here, the scanning ranges P1 and P2 of the scanners 3 and 3', respectively, overlap. Furthermore, the generation of light distributions with different spot sizes is achieved by using different lenses 5 and 5' in the entrance optical means. In particular, in the intermediate image plane Z and therefore also in the light distribution LV, the scanner 3' produces a light spot SP2 which is substantially larger than the light spot SP1 produced by the scanner 3. Moreover, the stop was omitted in the embodiment in FIG. 4, wherein the stop position from FIG. 3 is still indicated by the line L". In order to generate a light/dark boundary in the dipped beam distribution, use is now made of the spot SP1, which scans in the region of the earlier position of the stop. As a result of the small size of the spot SP1, this renders it possible to generate a sharp light/dark boundary, even without a stop.

In addition to the advantage of avoiding shadowing, the lighting device in accordance with the above-described embodiments has further advantages. In particular, when a plurality of scanners are used, the deflection frequency for achieving the same spatial resolution or the same brightness gradient of the light distribution can be reduced. As a result of the reduced deflection frequency, bothersome scanning effects, such as e.g. the stroboscopic effect, are avoided in this case. Moreover, a simple setup of the lighting apparatus is ensured by integrating the plurality of scanners on a common assembly and by using common entrance and exit optical means. Furthermore, the achievable scanning rate can be increased by using a plurality of scanners. This can be achieved by dividing the illumination field into a plurality of separate scanning ranges, as indicated in FIG. 3 and FIG. 4. However, the increase in the scanning rate can optionally also be realized by multiple scanning of a common scanning field.

LIST OF REFERENCE SIGNS

1 Light source
2 Scanning apparatus
201 Assembly
3, 3' Scanner
4 Positive lens
5, 5' Lens array
6 Stop
7 Exit optical means
P, P1, P2 Scanning ranges
L, L' Light beams
L" Stop position
SZ Shadow zone
LV Light distribution
Z Intermediate image plane
O Optical axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting device for a motor vehicle, comprising:
   a light source made of a number of semiconductor diodes; and
   a scanning apparatus onto which light from the light source is incident and which, when the lighting device is in operation, produces a time-varying deflection of the incident light from the light source and, thereby, a predetermined light distribution at a distance from the lighting device,
   wherein the scanning apparatus comprises at least two separately actuatable scanners, onto which in each case a separate light beam produced from the light of the light source is incident, the deflection of which light beam is varied in time by the respective scanner,
   wherein a stop is arranged in the beam path of the light beams after deflection by the scanning apparatus, and
   wherein the stop brings about a subdivision of an image plane into two regions.

2. The lighting device as claimed in claim 1, wherein each of the at least two separately actuatable scanners respectively comprise at least one of a two-dimensional scanning unit and a vector scanning unit.

3. The lighting device as claimed in claim 1, wherein the lighting device comprises at least one entrance optical means for the light from the light source, wherein, when the lighting device is in operation, the separate light beams are produced by way of the at least one entrance optical means.

4. The lighting device as claimed in claim 3, wherein a common entrance optical means is provided for producing all separate light beams.

5. The lighting device as claimed in claim 1, wherein at least one exit optical means, by means of which the predetermined light distribution is generated as an image, is provided for the light beams deflected by the at least two scanners.

6. The lighting device as claimed in claim 5, wherein a common exit optical means is provided for all deflected light beams.

7. The lighting device as claimed in claim 1, wherein at least one of the at least two separately actuatable scanners generates a separate region of the predetermined light distribution.

8. The lighting device as claimed in claim 1, wherein at least two of the at least two separately actuatable scanners generate overlapping regions of the predetermined light distribution.

9. The lighting device as claimed in claim 1, wherein the stop generates a light/dark boundary in the predetermined light distribution.

10. The lighting device as claimed in claim 1, wherein the stop extends substantially parallel to an optical axis predetermined by the beam path of the light beams.

11. The lighting device as claimed in claim 1, wherein, in at least one mode of operation of the lighting device, a first part of the scanners of the scanning apparatus is provided exclusively for deflecting light beams in a region below the stop, and a second part of the scanners of the scanning apparatus is provided exclusively for deflecting light beams in a region above the stop.

12. The lighting device as claimed in claim 1, wherein, in at least one mode of operation of the lighting device, at least one scanner is provided exclusively for generating the light distribution at a light/dark boundary.

13. The lighting device as claimed in claim 1, wherein the at least two scanners of the scanning apparatus are provided on a common assembly, wherein the common assembly includes at least one of a common cooling unit, a common electronics unit for the scanners, and a common mechanical adjustment apparatus for a support, on which the scanners are assembled.

14. The lighting device as claimed in claim 1, wherein at least one scanner is embodied as a MEMS element.

15. The lighting device as claimed in claim 1, wherein a number of semiconductor diodes of the light source comprises one or more laser diodes.

16. The lighting device as claimed in claim 1, wherein the light source produces monochromatic light, wherein a conversion element converts the light from the light source into white light.

17. The lighting device as claimed in claim 1, wherein the lighting device comprises at least one of a signal light and a headlamp.

18. The lighting device as claimed in claim 1, wherein the lighting device comprises a headlamp configured such that, during operation, at least one of a dipped beam characteristic and a main beam characteristic is generated as predetermined light distribution.

19. A lighting device for a motor vehicle, comprising:
a light source made of a number of semiconductor diodes; and
a scanning apparatus onto which light from the light source is incident and which, when the lighting device is in operation, produces a time-varying deflection of the incident light from the light source and, thereby, a predetermined light distribution at a distance from the lighting device,
wherein the scanning apparatus comprises at least two separately actuatable scanners, onto which in each case a separate light beam produced from the light of the light source is incident, the deflection of which light beam is varied in time by the respective scanner,
wherein the separate light beams generate light spots with different sizes in the predetermined light distribution.

20. The light device of claim 19, wherein the separate light beams generate light spots with different sizes in the predetermined light distribution by virtue of an entrance optical means having different sized lenses through which the separate light beams pass.

21. A motor vehicle comprising a lighting device, wherein the lighting device comprises:
a light source made of a number of semiconductor diodes; and
a scanning apparatus onto which light from the light source is incident and which, when the lighting device is in operation, produces a time-varying deflection of the incident light from the light source and, thereby, a predetermined light distribution at a distance from the lighting device,
wherein the scanning apparatus comprises at least two separately actuatableg scanners, onto which in each case a separate light beam produced from the light of the light source is incident, the deflection of which light beam is varied in time by the respective scanner,
wherein a stop is arranged in the beam path of the light beams after deflection by the scanning apparatus, and
wherein the stop brings about a subdivision of an image plane into two regions.

\* \* \* \* \*